(12) United States Patent
Meulenberg et al.

(10) Patent No.: US 8,016,924 B2
(45) Date of Patent: Sep. 13, 2011

(54) DEVICE FOR GAS SEPARATION AND METHOD FOR PRODUCING SUCH A SYSTEM

(75) Inventors: Wilhelm A. Meulenberg, Vijlen (NL); Ralf Hansch, Bad Neuenahr (DE); Hans Peter Buchkremer, Heinsberg (DE); Detlev Stöver, Niederzier (DE)

(73) Assignee: Forschungszentrum Juelich GmbH, Juelich (DE)

( * ) Notice: Subject to any disclaimer, the term of this patent is extended or adjusted under 35 U.S.C. 154(b) by 910 days.

(21) Appl. No.: 11/663,551

(22) PCT Filed: Aug. 13, 2005

(86) PCT No.: PCT/DE2005/001442
§ 371 (c)(1),
(2), (4) Date: Mar. 22, 2007

(87) PCT Pub. No.: WO2006/032230
PCT Pub. Date: Mar. 30, 2006

(65) Prior Publication Data
US 2009/0193975 A1    Aug. 6, 2009

(30) Foreign Application Priority Data

Sep. 24, 2004    (DE) .......................... 10 2004 046 310

(51) Int. Cl.
*B01D 53/22*    (2006.01)

(52) U.S. Cl. ................. 96/11; 95/45; 95/55; 95/56; 96/4

(58) Field of Classification Search ................. 95/45, 55, 95/56; 96/4, 11
See application file for complete search history.

(56) References Cited

U.S. PATENT DOCUMENTS

| | | | |
|---|---|---|---|
| 4,705,827 A | 11/1987 | Kodama | |
| 5,110,470 A | 5/1992 | Yokosawa | |
| 5,250,184 A | 10/1993 | Maier | |
| 5,492,873 A | 2/1996 | Maier | |
| 5,605,628 A | 2/1997 | Davidson | |
| 6,156,283 A * | 12/2000 | Allen et al. | 423/219 |
| 6,464,881 B2 | 10/2002 | Thoraval | |
| 6,854,602 B2 * | 2/2005 | Oyama et al. | 210/490 |
| 2001/0001453 A1 | 5/2001 | Thoraval | |

FOREIGN PATENT DOCUMENTS

| | | |
|---|---|---|
| JP | 2000000444 B | 1/2000 |
| JP | 2004 89838 | 3/2004 |

OTHER PUBLICATIONS

Machine Translation of Shigenobu (JP 2004-089838).*

* cited by examiner

*Primary Examiner* — Jason M Greene
*Assistant Examiner* — Anthony Shumate
(74) *Attorney, Agent, or Firm* — Andrew Wilford

(57) ABSTRACT

A system for gas separation has a mechanically stable metallic substrate layer having a pair of opposite faces and formed throughout with open pores. Respective functional layers laminated on each of the faces are composed of $TiO_2$ or $ZrO_2$. These functional layers are formed throughout with pores having an average pore diameter of less than 1 nm.

10 Claims, No Drawings

DEVICE FOR GAS SEPARATION AND METHOD FOR PRODUCING SUCH A SYSTEM

CROSS REFERENCE TO RELATED APPLICATIONS

This application is the US national phase of PCT application PCT/DE2005/001442, filed 13 Aug. 2005, published 30 Mar. 2006 as WO2006/032230, and claiming the priority of German patent application 102004046310.7 itself filed 24 Sep. 2004, whose entire disclosures are herewith incorporated by reference.

FIELD OF THE INVENTION

The invention relates to a system for gas separation, in particular for separation of $N_2/O_2$, $CO_2/H_2$, and $N_2/CO_2$ gas mixtures. The invention further relates to a method for producing such a system.

PRIOR ART

Separation of media, in particular gases, is possible in principle by the use of membranes. A distinction is made between mesoporous membranes that have a pore diameter between 2 and 50 nm, and microporous membranes that have a pore diameter of less than 2 nm.

In mesoporous membranes, gas transport occurs via Knudsen diffusion, which is dependent on the adsorption properties of the membrane material. The separation factor for gas mixtures is generally low for such membranes.

For separation of individual gases from gas mixtures, the use of microporous membranes, such as silica membranes, is known from the literature. The gas separation is based on the principle of molecular sieves, in which a first gas from the gas mixture can pass through the membrane, but another gas cannot due to the greater kinetic molecular diameter. The driving force for the separation process is the pressure differential between the two gas spaces.

The most important parameters for gas separation membranes are their permeability and separation factors. These properties determine the separation efficiency and the membrane requirements for a separation task.

At stationary conditions under the driving force for a partial pressure differential for a particle, a flow J (units: kg $m^{-2}$ $s^{-1}$) results through a membrane portion having an area A. The permeability P of a membrane is expressed as the normalized volumetric flow per membrane area, time, and partial pressure differential for the permeating gas (units: $nm^3$ (STP) $m^{-2}$ $h^{-1}$ $bar^{-1}$, STP: 0° C., 101,325 Pa, 22.414 L molar volume).

The separation efficiency of a membrane material is given by the separation factor $\alpha$. The separation factor for a gas pair is defined as the ratio of the gas permeabilities P, and is dependent on the temperature, feed pressure, and pressure differential over the membrane, as well as the pore diameter and pore distribution. As an approximation, separation factors are not dependent on the membrane thickness. Exceptions are membranes having very thin separation layers (<0.1 µm) compared to isotropic films (100 µm).

Gas permeation separates gas streams into streams of various components. Established industrial applications of gas permeation include the separation of hydrogen from process gas, nitrogen/oxygen separation from air, and recovery of organic vapors such as gasoline vapors from gas/air mixtures.

The use of gas permeation using inorganic membranes also shows promise. These include microporous membranes, such as multilayer silica membranes (amorphous $SiO_2$), zeolite membranes, or carbon membranes, as well as metallic membranes (PdAg alloy, for example) or perovskite membranes as mixture-conducting membranes. The fields of application for inorganic membranes are numerous and diverse. They share the common feature of use under difficult process conditions such as high temperature and/or high pressure.

Typical applications of gas permeation using inorganic membranes are in particular the purification of gas streams necessary for subsequent process steps (risk of catalyst poisoning, for example), shifting of the reaction equilibrium by selective separation of products or by-products, and concentration of product streams for reducing the energy demand for subsequent end processing steps.

Membrane units frequently have a modular design, and may therefore be variably adapted to different objectives. In addition, different throughputs may be accommodated. Such membranes do not require movable parts, and as a rule are relatively light and compact.

High product purity can usually be obtained using the membrane process, but generally only with a comparatively great level of effort, since high selection rates, for example, are achieved only by dense membranes. Also from the operational standpoint, the membrane processes are restricted to relatively narrow pH, temperature, and moisture ranges due to, among other factors, the typically limited thermal and chemical stability of the membrane materials.

Ceramics having a selectively set porosity, for example, are known from the Fraunhofer Institute for Ceramic Technologies and Sintered Materials (IKTS) that are produced by sintering narrowly fractionated particles. Open, permeable pore volumes of 30-60 volume-% and narrow pore size distributions are obtained averaging in the micrometer or nanometer range.

Ceramic filtration membranes for liquid filtration and gas separation are produced by application, sometimes in multiple coatings, of thin layers having fine porosities onto a coarsely porous substrate. Such membranes are referred to as asymmetrical membranes. Typical substrates are tubes or multichannel elements. The use of disks as substrates results in flat membranes.

The advantage of ceramic membranes compared to polymer filters is that use is made of the high thermal and chemical resistance of the ceramic.

Also known from the Fraunhofer Institute for Ceramic Technologies and Sintered Materials (IKTS) are polymer membranes having layer thicknesses that may be set between 1 and 5 µm and that are produced by coating the substrate with a specially prepared organosilicon precursor, followed by polymer pyrolysis. Various porosities and pore sizes are obtained, depending on the type and molecular structure of the polymer used. One precursor system results in, for example, pore diameters of approximately 1.5 nm with a narrow distribution, and BET surfaces of up to 600 $m^2/g$. Pyrolysis of other polymer classes results in various pore diameters between 4 and 20 nm with a narrow pore size distribution, depending on the molecular structure and the thermolytic conditions. After pyrolysis an opaque, crack-free, highly porous silicon carbide layer is present on the substrate surface that is used as a filter-active separating layer in the membrane filtration process.

For gas phase separation of commercially important gases emitted from a fossil fuel-fired power plant, there are currently over 40 different approaches, of which only the chemical separation technology, i.e. absorption in amine solutions in pilot power plants, has thus far been used on an industrial scale.

For separation by set pore sizes, polymer membranes have been developed for separation in the low-temperature range. Hydrogen-permeable AgPd membranes and amorphous microporous silica membranes, for example, exist for high-temperature applications up to approximately 500° C. Ionic, mixed, or proton conductors may also be considered.

It is disadvantageous that the chemical processes generally have a high loss in efficiency, whereas the polymer membranes are limited to applications at low temperatures. The maximum operational limits for costly AgPd membranes and for silica membranes is approximately 500° C. It is disadvantageous that these membranes are also sensitive to water.

OBJECT OF THE INVENTION

The object of the invention is to provide a system that allows gas separation of commercially important gases such as $H_2$, $N_2$, $O_2$, or $CO_2$ from a gas mixture, in particular at higher temperatures. It is a further object of the invention to provide a method for producing such a system.

SUMMARY OF THE INVENTION

Within the scope of the invention it has been found that a thin membrane comprising a metallic and/or ceramic substrate layer and an oxidic functional layer provided thereon has an effective separation factor for the separation of gases.

The substrate layer has an advantageous effect on the mechanical stability of the membrane, and in particular may be composed of steel, for example 316 L stainless steel and/or a ceramic. The thickness of the substrate layer depends on the separation task, and may vary between 100 μm and 1 mm. The thickness of the substrate layer influences the permeation rate, and in principle should therefore be as thin as possible, in particular less than 1 mm. However, in order to meet their function as a substrate layer it is desirable and advantageous to have layer thicknesses of at least 100 μm, preferably 200 μm. Metallic substrate layers generally have better stability than ceramic layers of a comparable layer thickness.

The substrate layer itself has a porous structure throughout, with an average pore size in the μm range. The average pore diameter may be determined in particular by scanning electron microscopy (SEM), or, for smaller pore diameters, by transmission electron microscopy (TEM). The pores are selected to be much larger than those in the adjacent functional layer. The substrate layer should provide mechanical stability while producing the least possible flow resistance.

On at least one face of the substrate layer of the system according to the invention there is a functional layer having an average pore diameter less than 1 nm, in particular less than 0.8 nm, particularly preferably less than 0.5 nm, depending on the separation task to be achieved. The functional layer performs the actual separation of the gas molecules. Theoretically, the average pore diameter should be between that of the gas molecules to be separated. However, it has been shown that slightly larger pore diameters also result in a very satisfactory separation rate.

The functional layer consists in particular of $TiO_2$ or $ZrO_2$ and may have a particularly thin shape. Advantageous layer thicknesses are in the range of several nm to several hundred nm. The dimension is dependent on the separation task and the separation efficiencies to be achieved. The selectivity (separation factor α) generally increases with decreasing pore diameter of the functional layer. On the other hand, very small pores, especially in conjunction with a thicker functional layer, reduce the flow rate (permeation) considerably. Thus, the separation is always a balance between selectivity and permeation, and is adapted by one skilled in the art to the particular separation task to be achieved.

For better adhesion it is advantageous to optionally provide an intermediate layer between the substrate layer and the functional layer. This intermediate layer generally comprises oxidic systems, in particular ceramics. Examples of advantageous materials for the intermediate layer are $TiO_2$, $ZrO_2$, or $Al_2O_3$. The intermediate layer likewise has a porous structure throughout. The average pore diameter of the intermediate layer is advantageously between that of the substrate layer and that of the functional layer, in particular between 2 and 100 nm. The intermediate layer advantageously has a thickness ranging from 100 nm to 50 μm.

In one special embodiment of the invention, a functional layer optionally provided with an intermediate layer is situated on both faces of the substrate layer. The symmetrical arrangement is selected in particular when the individual layers are very thin, since in that case the symmetrical arrangement on both faces advantageously results in additional stability of the separation system. In addition, the symmetrical shape consistently minimizes warping during the sintering process.

In a further advantageous embodiment of the invention, the functional layer, optionally together with an intermediate layer, is present as a graduated layer. The characteristics of the above-referenced intermediate layer are then present in particular at the substrate-layer/graduated-layer interface, whereas the characteristics of the above-referenced functional layer are present in particular at the exposed surface of the laminate. In other words, the average pore diameter of the substrate layer facing the exposed gas/functional-layer surface in principle decreases continuously and in a graduated manner.

Within the scope of the invention, for stability reasons an additional layer having coarser pores may also be provided on the outer functional layer having a very small pore diameter.

To produce the gas separation system according to the invention, first a porous ceramic or metallic film having a layer thickness between 200 and 500 μm is prepared as the substrate layer. A cermet may also be used as the substrate layer. The porosities are in the μm range. One or more ceramic intermediate layers having pore sizes in the 2-100 nm range are applied on one or both faces, for example. Coating on both faces with the intermediate layer is particularly practical when the aim is to prevent warping of a very thin substrate layer during heat treatment. The functional layer necessary for the actual gas separation may advantageously be applied by use of a sol-gel method. However, chemical vapor deposition (CVD) or physical vapor deposition (PVD) may also be used as application techniques. In the sol-gel method the porosity in the functional layer is set by use of a sol composition under pyrolysis conditions, i.e. burning off the organic components, and sintering conditions.

The gas separation systems (membranes) according to the invention consistently have high permeability, high selectivity, and good stability under conditions of use. They are therefore particularly suited for gas separation of commercially important gases such as $N_2$, $O_2$, $CO_2$, $H_2$, He, or CH, from gas mixtures.

SPECIFIC DESCRIPTION

The subject matter of the invention is described in greater detail below with reference to one illustrated embodiment, without limiting the subject matter of the invention thereto. A TiO$_2$ intermediate layer (d=20-30 µm, grain size 200 nm) was applied by wet powder spraying or screen printing to a porous, film-cast steel substrate made of 316 L stainless steel (d=200-300 µm, grain size less than 5 µm) presintered at 900° C./1 min. After sintering at 950° C./1 hour under vacuum, a functional layer of TiO$_2$ or alternatively ZrO$_2$ was applied. A sol-gel composed of an organic precursor, for example titanium propylate, zirconium propylate, or acetylacetone, and an a-position carboxylic acid was used, and was applied by spin coating or an immersion process. This was followed by pyrolysis (at 600° C./1 hour, for example) of the organic components of the sol, and final sintering of the sample at temperatures up to 1000° C.

Table of kinetic diameters of gases:
CH$_4$ 0.38 nm
N$_2$ 0.364 nm
O$_2$ 0.346 nm
CO$_2$ 0.33 nm
H$_2$ 0.289 nm
He 0.26 nm

The invention claimed is:

1. A system for gas separation, the system comprising:
a mechanically stable metal substrate layer having a pair of faces and formed throughout with open pores, and
a functional layer laminated to one of the faces, composed of TiO$_2$ or ZrO$_2$, formed throughout with pores, and having an average pore diameter of less than 1 nm.

2. The system according to claim 1 wherein the substrate layer has a thickness between 100 µm and 1 mm.

3. The system according to claim 1, further comprising an intermediate layer between the substrate layer and the functional layer.

4. The system according to preceding claim 3 wherein the intermediate layer is composed of Al$_2$O$_3$, TiO$_2$, or ZrO$_2$.

5. The system according to claim 3 wherein the intermediate layer has a thickness between 100 nm and 100 µm.

6. The system according to claim 1 wherein the functional layer has an average pore diameter of less than 0.8 nm.

7. The system according to claim 1 wherein the functional layer is graduated.

8. A system for gas separation, the system comprising:
a mechanically stable metal substrate layer having a pair of opposite faces and formed throughout with open pores; and
respective functional layers on each of the faces and composed of TiO$_2$ or ZrO$_2$, the functional layers being formed throughout with pores having an average pore diameter of less than 1 nm.

9. A system for gas separation, the system comprising:
a mechanically stable metal substrate layer having a pair of opposite faces and formed throughout with open pores; and
a functional layer on at least one of the faces, composed of TiO$_2$ or ZrO$_2$, and formed throughout with pores having an average pore diameter of less than 1 nm and varying continuously or graduatedly.

10. The system according to claim 9 wherein the average pore diameter of the substrate layer decreases away from an exposed outer surface of the functional layer.

\* \* \* \* \*